(12) United States Patent
Cui et al.

(10) Patent No.: US 12,181,715 B2
(45) Date of Patent: Dec. 31, 2024

(54) OPTICAL FIBER ADAPTER

(71) Applicant: ACON OPTICS COMMUNICATIONS INC., New Taipei (TW)

(72) Inventors: Yangyang Cui, New Taipei (TW); Yanmei Chang, New Taipei (TW)

(73) Assignee: ACON OPTICS COMMUNICATIONS INC., New Taipei (TW)

( * ) Notice: Subject to any disclaimer, the term of this patent is extended or adjusted under 35 U.S.C. 154(b) by 228 days.

(21) Appl. No.: 17/892,111

(22) Filed: Aug. 21, 2022

(65) Prior Publication Data

US 2023/0060332 A1    Mar. 2, 2023

(30) Foreign Application Priority Data

Sep. 2, 2021 (CN) .......................... 202122102482.X

(51) Int. Cl.
G02B 6/38    (2006.01)

(52) U.S. Cl.
CPC ......... *G02B 6/3825* (2013.01); *G02B 6/3893* (2013.01)

(58) Field of Classification Search
None
See application file for complete search history.

(56) References Cited

U.S. PATENT DOCUMENTS

| 5,687,268 | A | | 11/1997 | Stephenson et al. | |
|---|---|---|---|---|---|
| 5,909,526 | A | * | 6/1999 | Roth | G02B 6/3825 385/56 |
| 10,133,009 | B1 | * | 11/2018 | Wu | G02B 6/3885 |
| 11,237,339 | B2 | * | 2/2022 | Nguyen | G02B 6/3825 |
| 2003/0180005 | A1 | * | 9/2003 | McBride | G02B 6/3825 385/73 |
| 2013/0188912 | A1 | * | 7/2013 | Bimboese | G02B 6/4285 385/60 |
| 2015/0117820 | A1 | * | 4/2015 | Lin | G02B 6/387 385/78 |
| 2020/0200977 | A1 | * | 6/2020 | Nguyen | G02B 6/3831 |

FOREIGN PATENT DOCUMENTS

EP    0949521    10/1999

OTHER PUBLICATIONS

"Search Report of Europe Counterpart Application", issued on Jan. 20, 2023, p. 1-p. 8.

* cited by examiner

*Primary Examiner* — Jerry Rahll
(74) *Attorney, Agent, or Firm* — JCIPRNET

(57) ABSTRACT

An optical fiber adapter for butting an insertion core head and an optical fiber connector is provided. The optical fiber adapter includes a housing and a movable plate. The housing includes a main body and an extending portion. The main body has a first port. The extending portion extends from the main body and away from the first port, and the optical fiber connector is adapted to be inserted into the main body from the first port. The movable plate is pivoted to the extending portion to form a second port, and the insertion core head is adapted to be inserted into the main body from the second port.

10 Claims, 6 Drawing Sheets

OPTICAL FIBER ADAPTER

CROSS-REFERENCE TO RELATED APPLICATION

This application claims the priority benefit of China application serial no. 202122102482.X, filed on Sep. 2, 2021. The entirety of the above-mentioned patent application is hereby incorporated by reference herein and made a part of this specification.

BACKGROUND

Technical Field

The disclosure relates to an optical fiber adapter.

Description of Related Art

An existing adapter for connecting an optical fiber insertion core head and an optical fiber connector accommodates and connects the two with a fixed housing structure. Therefore, except for using specific matching tools or directly destroying the structure, it isn't easy to disengage a connected insertion core head from an adapter.

Accordingly, how to improve upon the operation inconvenience caused by the above-mentioned situation is an issue that those skilled in the art need to consider and solve.

SUMMARY

The disclosure provides an optical fiber adapter, which has both a fixed combination function and a release function through a movable structure, to increase the convenience of operation.

The optical fiber adapter of the disclosure is for butting an insertion core head and an optical fiber connector. The optical fiber adapter includes a housing and a movable plate. The housing includes a main body and an extending portion. The main body has a first port. The extending portion extends from the main body and away from the first port, and the optical fiber connector is adapted to be inserted into the main body from the first port. The movable plate is pivoted to the extending portion to form a second port, and the insertion core head is adapted to be inserted into the main body from the second port.

In an embodiment of the disclosure, the insertion core head is a multi-fiber push on (MPO) insertion core head, and the optical fiber connector is an MT-type optical fiber connector.

In an embodiment of the disclosure, the movable plate has a pair of pivot shafts, which are detachably buckled to a pair of pivot notches of the extending portion, and are rotated, opened, and closed relative to the extending portion.

In an embodiment of the disclosure, a shaft body of each of the pivot shafts has a pair of cross-sectional planes facing each other, and a relative distance between the cross-sectional planes is greater than an opening size of each of the pivot notches.

In an embodiment of the disclosure, the extending portion and the movable plate each have a limiting step, which are away from the main body and correspond to each other. When the insertion core head is inserted into the main body, the movable plate is rotated and closed relative to the extending portion, so that a tail portion of the insertion core head is buckled to the limiting step.

In an embodiment of the disclosure, the movable plate, the extending portion, and the limiting step provide a two-dimensional limitation to the insertion core head.

In an embodiment of the disclosure, when the movable plate is closed relative to the extending portion, the movable plate is parallel to the extending portion.

In an embodiment of the disclosure, the extending portion has a limiting protrusion extending away from the second port, located between the movable plate and a bottom plate of the extending portion, to limit the insertion core head. The movable plate, the extending portion, and the limiting protrusion form the second port, and provide a three-dimensional limitation to the insertion core head.

In an embodiment of the disclosure, the movable plate has a blocking protrusion, and the extending portion further has a blocking step, which is located on a moving path of the blocking protrusion. The blocking protrusion abuts against the blocking step so that the movable plate is closed relative to the extending portion.

In an embodiment of the disclosure, the optical fiber adapter further includes a pair of elastic pieces, disposed on opposite sides of the main body and located between the first port and the second port.

Based on the above, the optical fiber adapter for butting the insertion core head and the optical fiber connector includes a housing and a movable plate. The housing includes a main body and an extending portion in an integrated structure. The main body has a first port for the insertion of the optical fiber connector, and the movable plate is pivotally connected to the extending portion to form a second port for the insertion of the insertion core head. According to this, the movable plate may be pivoted, opened, and closed relative to the extending portion, which is different from the existing optical fiber adapter with a fixed structure. Due to the above-mentioned features, the insertion core head inserted in the second port may be smoothly disassembled and assembled relative to the housing, so that an optical fiber adapter with a movable plate may be operated conveniently.

DETAILED DESCRIPTION OF DISCLOSED EMBODIMENTS

Figure 1:
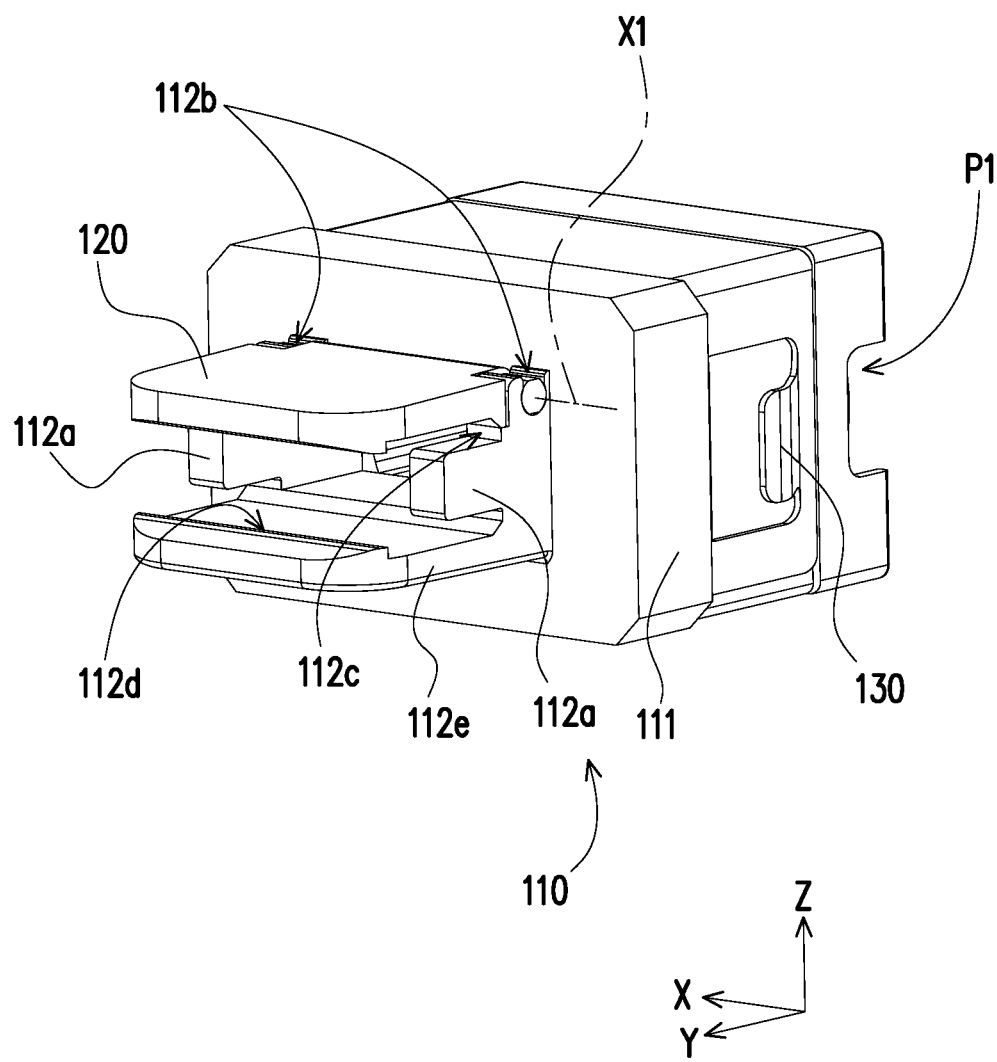
FIG. 1 is a schematic diagram of an optical fiber adapter according to an embodiment of the disclosure.
Figure 2:
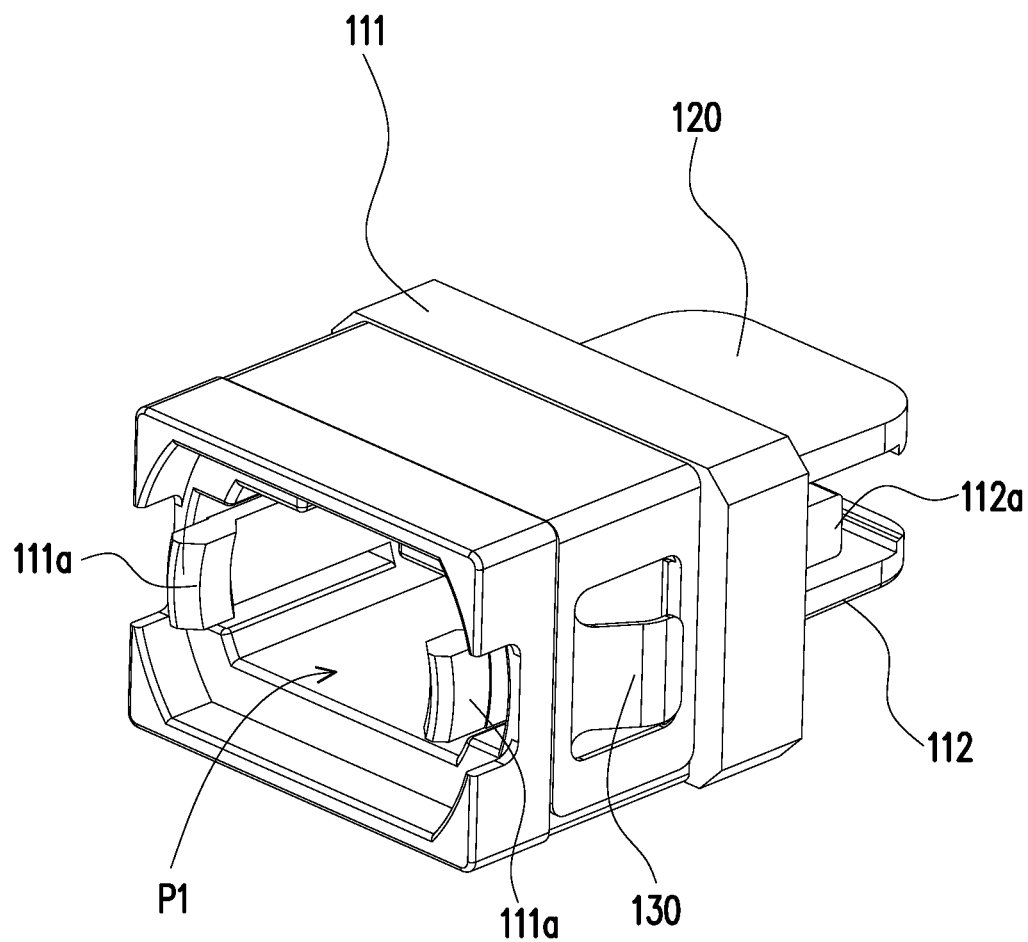
FIG. 2 illustrates the optical fiber adapter of FIG. 1 from another perspective.
Figure 3:
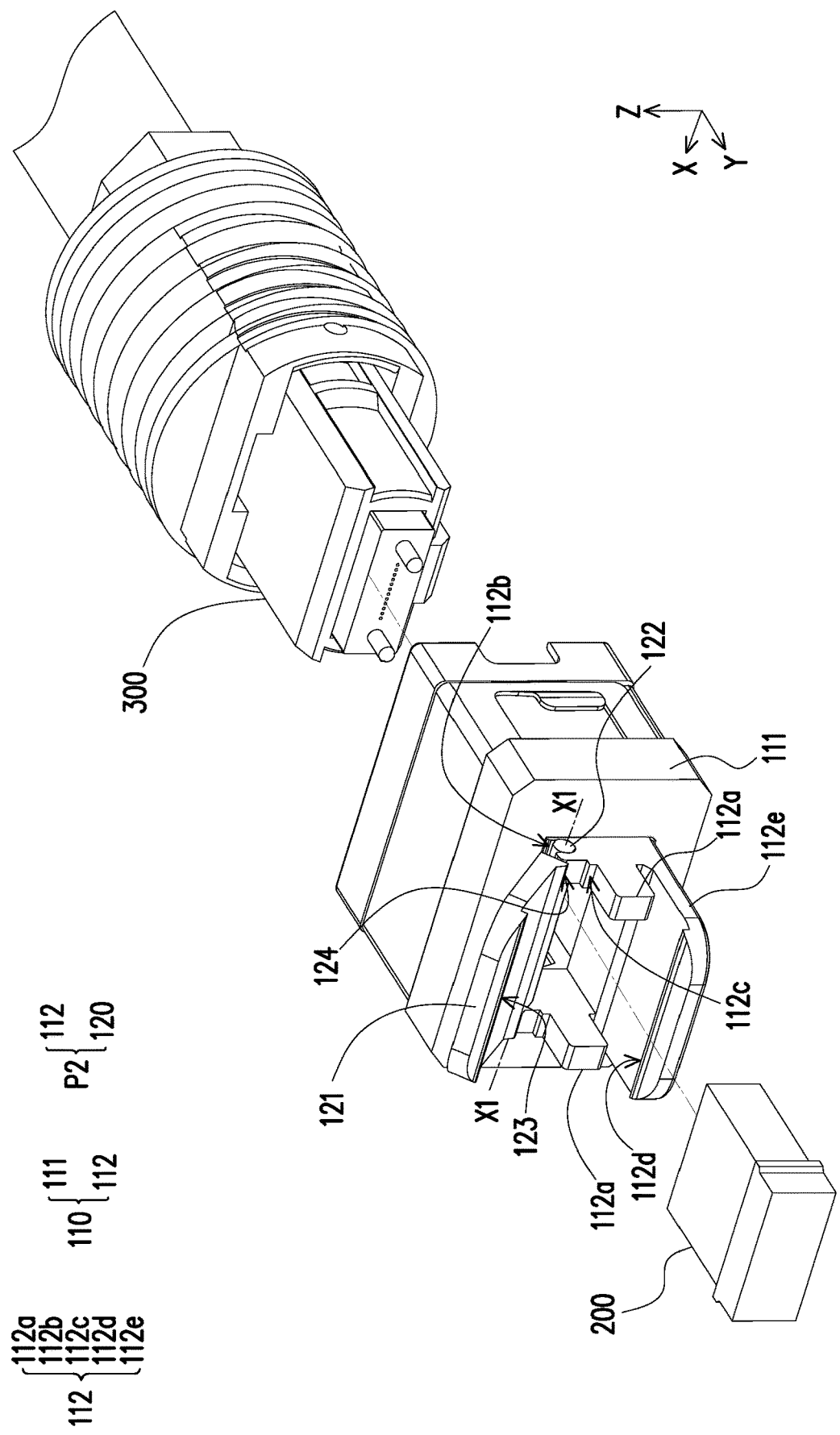
FIG. 3 illustrates an assembly schematic diagram of an insertion core head and the optical fiber adapter.

FIG. 1 is a schematic diagram of an optical fiber adapter according to an embodiment of the disclosure. FIG. 2 illustrates the optical fiber adapter of FIG. 1 from another perspective. FIG. 3 illustrates an assembly schematic diagram of an insertion core head and the optical fiber adapter, in which some structures are omitted to facilitate the clear identification of the main structural features. Cartesian coordinates XYZ are also provided here to facilitate component description. Referring to FIG. 1 to FIG. 3 at the same time, in this embodiment, an optical fiber adapter 100 is for butting an insertion core head 200 and an optical fiber connector 300. The optical fiber adapter 100 includes a housing 110 and a movable plate 120. The housing includes a main body 111 and an extending portion 112. The main body 111 has a first port P1. The extending portion 112 extends from the main body 111 and away from the first port P1, and the optical fiber connector 300 is adapted to be inserted into the main body 111 from the first port P1. The movable plate 120 is pivoted to the extending portion 112 and forms a second port P2. The insertion core head 200 is adapted to be inserted into the main body 111 from the second port P2, in which the insertion core head 200 is a multi-fiber push on (MPO) insertion core head, and the optical fiber connector 300 is an MT-type optical fiber connector. As shown in FIG. 2, after the optical fiber connector 300 is inserted into the main body 111, the optical fiber connector 300 is buckled by a pair of elastic hooks 111a of the main body 111, so that the optical fiber connector 300 is fixed in the optical fiber adapter 100 accordingly. Here, the main body 111 is for providing a space for the insertion core head 200 to be butted with an optical fiber ferrule of the optical fiber connector 300.

Furthermore, the optical fiber adapter 100 further includes elastic pieces 130 disposed on opposite sides of the main body 111 and located between the first port P1 and the second port P2. When the optical fiber adapter 100 is installed on a panel, the main body 111 and the extending portion 112 of the main body 111 may pass through the opening (not shown) on the panel, so that the end portion of the elastic piece 130 abuts against the structure beside the opening, so as to interfere with the panel along a specific direction, to prevent the optical fiber adapter 100 from being pulled out.

Figure 4:
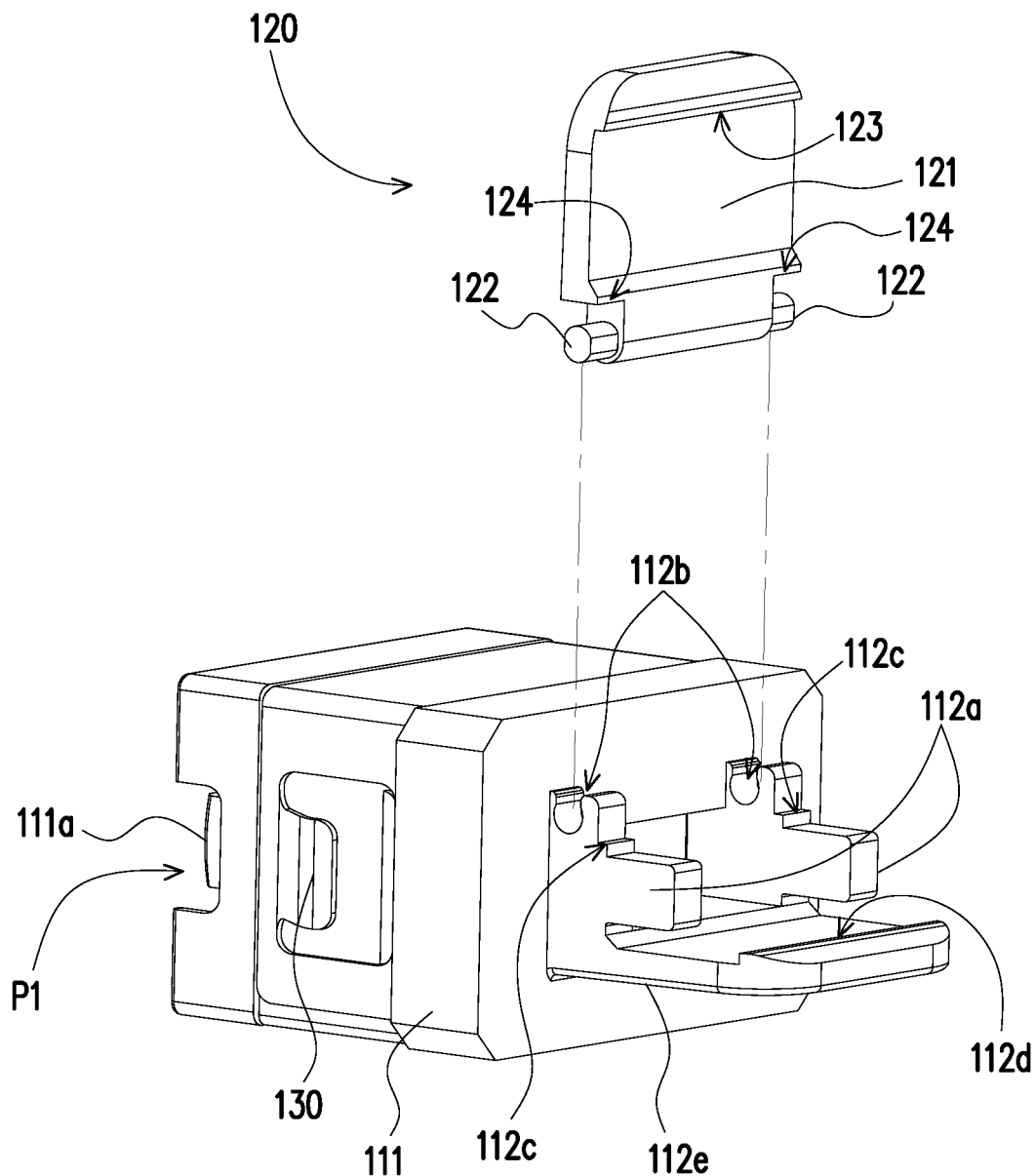
FIG. 4 illustrates an exploded diagram of the optical fiber adapter.
Figure 5:
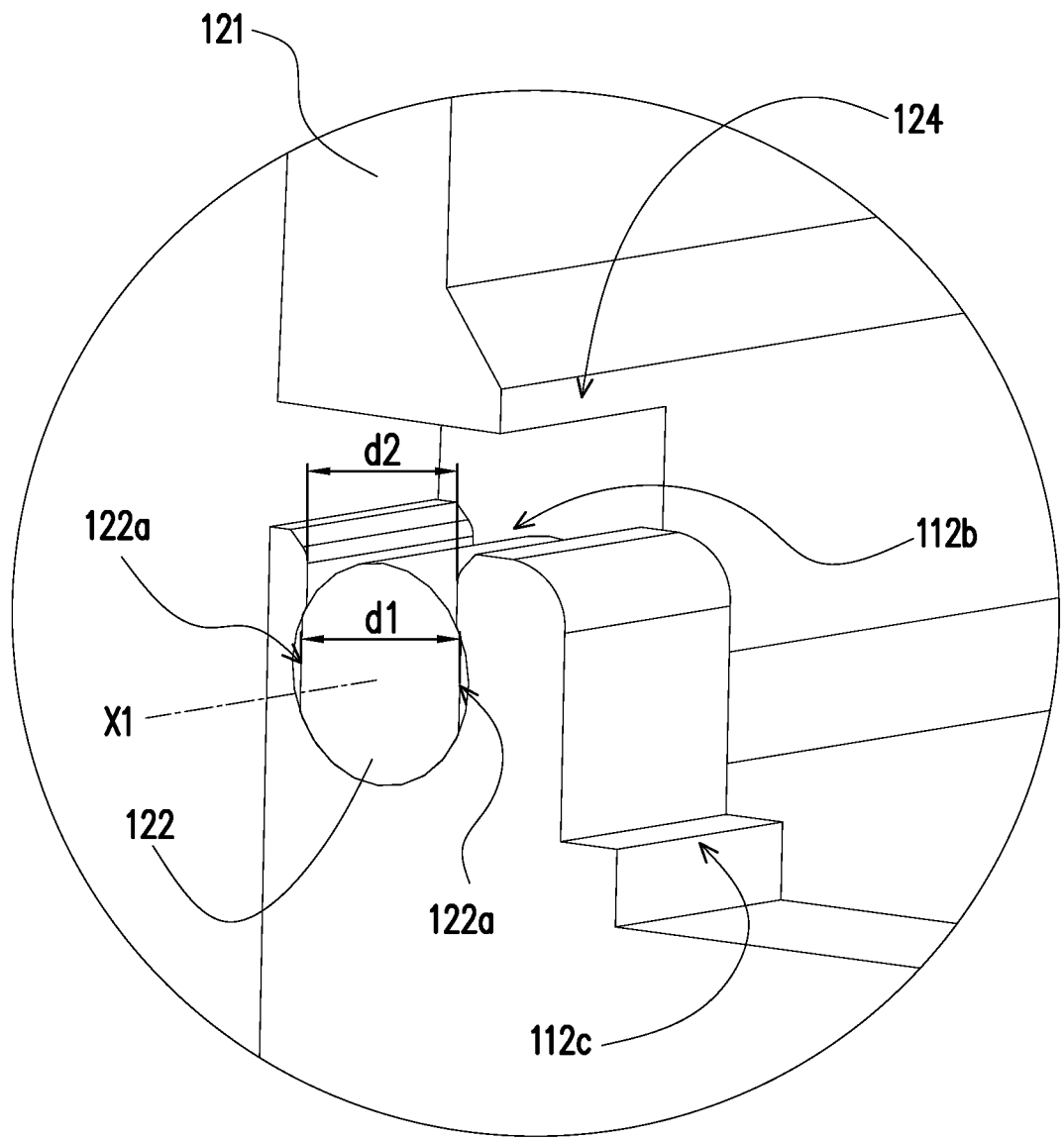
FIG. 5 illustrates a partial enlarged diagram of the optical fiber adapter of FIG. 4 after being assembled.
Figure 6:
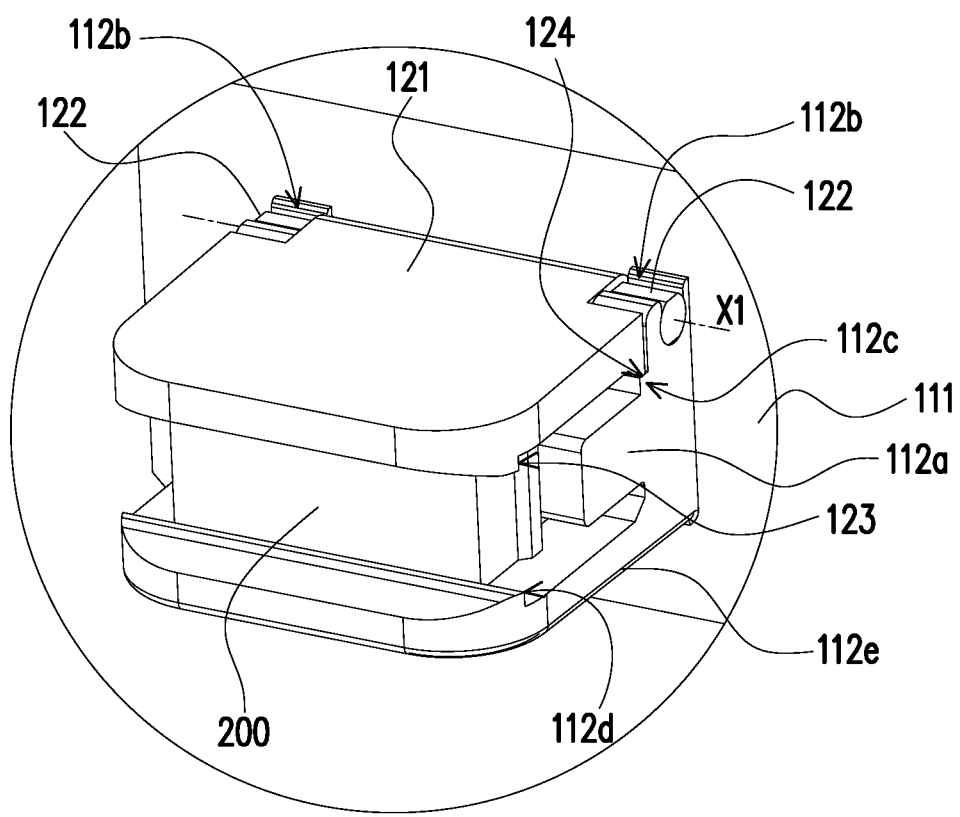
FIG. 6 illustrates a partial enlarged diagram of the insertion core head and the optical fiber adapter of FIG. 3 after being assembled.

FIG. 4 illustrates an exploded diagram of the optical fiber adapter. FIG. 5 illustrates a partial enlarged diagram of the optical fiber adapter of FIG. 4 after being assembled. FIG. 6 illustrates a partial enlarged diagram of the insertion core head and the optical fiber adapter of FIG. 3 after being assembled. Referring to FIG. 4 to FIG. 6 at the same time, in this embodiment, the movable plate 120 has a plate body 121 and a pair of pivot shafts 122. The plate body 121 is detachably buckled to a pair of pivot notches 112b of the extending portion 112 through the pivot shafts 122 so that the movable plate 120 is rotated, opened, and closed relative to the extending portion 112 around an axis X1. Here, the insertion core head 200 and the optical fiber connector 300 are substantially inserted and disengaged relative to the optical fiber adapter 100 along the Y-axis, and the above-mentioned axis X1 is consistent with the X-axis or parallel to the X-axis. At the same time, it should be noted that the closed state in this embodiment means that the movable plate 120 and the extending portion 112 (the bottom plate 112e of the extending portion 112) are parallel to each other, so as to facilitate buckling the insertion core head 200 to the optical fiber adapter 100.

Furthermore, the extending portion 112 and the movable plate 120 each have a limiting step 112d and a limiting step 123, which are away from the main body 111 and correspond to each other, in which the limiting step 123 is located on the plate body 121 away from the main body 111, and the limiting step 112d is located on a bottom plate 112e away from the main body 111. When the insertion core head 200 is inserted into the main body 111, the movable plate 120 is rotated and closed relative to the extending portion 112 around the axis X1, so that the tail portion of the insertion core head 200 is buckled to the limiting step 112d and the limiting step 123. As shown in FIG. 6, the movable plate 120, the extending portion 112, and the limiting step 123 and the limiting step 112d thereon provide a two-dimensional limitation to the insertion core head 200. Here, the two-dimensional limiting includes structurally providing a Z-axis limit to the insertion core head 200 through the plate body 121 of the movable plate 120 and the bottom plate 112e of the extending portion 112, and structurally providing a Y-axis limit to the insertion core head 200 through the limiting step 112d and the limiting step 123.

Referring to FIG. 5 again, the shaft body of the pivot shaft 122 in this embodiment has a pair of cross-sectional planes 122a parallel to and facing each other, and a relative distance d1 of the cross-sectional planes 122a is greater than an opening size d2 of the pivot notch 112b. This utilizes the structural interference relationship generated by the above-mentioned dimensional difference, so that the pivot shaft 122 may be smoothly snapped into the pivot notch 112b.

Referring to FIG. 4 and FIG. 6 again, in this embodiment, the extending portion 112 has a limiting protrusion 112a extending away from the second port P2, located between the movable plate 120 and the bottom plate 112e of the extending portion 112, to limit the insertion core head 200, in which the movable plate 120, the extending portion 112, and the limiting protrusion 112a forms the above-mentioned second port P2, and provides a three-dimensional limitation to the insertion core head 200. In addition to the aforementioned two-dimensional limitation, the three-dimensional limitation here also adds a pair of limiting protrusions 112a to provide a limiting effect to the insertion core head 200 along the X-axis.

In addition, the movable plate 120 of this embodiment further has a blocking protrusion 124, and the extending portion 112 also has a blocking step 112c located between the pivot notch 112b and the limiting protrusion 112a, and located on a movement path of the blocking protrusion 124. To put it simply, when the movable plate 120 is rotated relative to the extending portion 112 around the axis X1 and moves to the aforementioned closed state, the blocking protrusion 124 abuts against the blocking step 112c so that the movable plate 120 maintains its closed state relative to the extending portion 112.

To sum up, in the above-mentioned embodiments of the disclosure, the optical fiber adapter for butting the insertion core head and the optical fiber connector includes a housing and a movable plate. The housing includes a main body and an extending portion in an integrated structure. The main body has a first port for the insertion of the optical fiber connector, and the movable plate is pivotally connected to the extending portion to form a second port for the insertion of the insertion core head. Here, the movable plate and the bottom plate of the extending portion, the movable plate and the limiting step of the extending portion, and a pair of limiting protrusions of the extending portion respectively provide the limitation of the insertion core head in different dimensions, that is, after the insertion core head is inserted into the optical fiber adapter, the three-dimensional limitation may be provided to the insertion core head with the above mentioned three structures, and the insertion core head may be fixed to the optical fiber adapter accordingly. Conversely, when the insertion core head is to be removed, it is only necessary to drive the movable plate to release one of the above-mentioned three-dimensional limitations, so that the insertion core head may be successfully removed from the optical fiber adapter.

According to this, the movable plate may be pivoted, opened, and closed relative to the extending portion, which is different from the existing optical fiber adapter with a fixed structure. Due to the above-mentioned features, the insertion core head inserted in the second port may be smoothly disassembled and assembled relative to the housing, so that an optical fiber adapter with a movable plate may be operated conveniently.

What is claimed is:

1. An optical fiber adapter, for butting an insertion core head and an optical fiber connector, the optical fiber adapter comprising:
   a housing, comprising a main body and an extending portion, wherein the main body has a first port, the extending portion extends from the main body and away from the first port, and the optical fiber connector is adapted to be inserted into the main body from the first port; and
   a movable plate, pivoted to the extending portion to form a second port, wherein the insertion core head is adapted to be inserted into the main body from the second port when the movable plate is rotated and opened relative to the extending portion, and the insertion core head is buckled to the movable plate and the extending portion when the movable plate is rotated and closed relative to the extending portion.

2. The optical fiber adapter according to claim 1, wherein the insertion core head is a multi-fiber push on (MPO) insertion core head, and the optical fiber connector is an MT-type optical fiber connector.

3. The optical fiber adapter according to claim 1, wherein the movable plate has a pair of pivot shafts detachably buckled to a pair of pivot notches of the extending portion and rotated, opened, and closed relative to the extending portion.

4. The optical fiber adapter according to claim 3, wherein a shaft body of each of the pivot shafts has a pair of cross-sectional planes facing each other, and a relative distance between the pair of cross-sectional planes is greater than an opening size of each of the pivot notches when the movable plate is opened relative to the extending portion.

5. The optical fiber adapter according to claim 1, wherein the extending portion and the movable plate each have a limiting step, the pair of limiting steps are away from the main body and correspond to each other, and when the insertion core head is inserted into the main body, the movable plate is rotated and closed relative to the extending portion, so that a tail portion of the insertion core head is buckled to the pair of limiting steps.

6. The optical fiber adapter according to claim 5, wherein the movable plate, the extending portion, and the pair of limiting steps provide a two-dimensional limitation to the insertion core head.

7. The optical fiber adapter according to claim 1, wherein when the movable plate is closed relative to the extending portion, the movable plate is parallel to the extending portion.

8. The optical fiber adapter according to claim 1, wherein the extending portion has a pair of limiting protrusions extending away from the second port and located between the movable plate and a bottom plate of the extending portion to limit the insertion core head, and the movable plate, the extending portion, and the pair of limiting protrusions form the second port and provide a three-dimensional limitation to the insertion core head.

9. The optical fiber adapter according to claim 8, wherein the movable plate has a blocking protrusion, the extending portion further has a blocking step located on a moving path of the blocking protrusion, and the blocking protrusion abuts against the blocking step so that the movable plate is closed relative to the extending portion.

10. The optical fiber adapter according to claim 1, further comprising a pair of elastic pieces disposed on opposite sides of the main body and located between the first port and the second port, wherein when the optical fiber adapter is installed on a panel, the main body and the extending portion of the main body pass through an opening on the panel, and the elastic pieces abut against a structure beside the opening to interfere with the panel.

\* \* \* \* \*